(12) United States Patent
Manuel et al.

(10) Patent No.: US 6,574,323 B1
(45) Date of Patent: Jun. 3, 2003

(54) SPECIAL NEED PROCESSING OF SERVICES PROVIDED BY AN ADVANCED INTELLIGENT NETWORK

(75) Inventors: James A. Manuel, Brookeville, MD (US); Susan M. Middleswarth, Silver Spring, MD (US)

(73) Assignee: Verizon Services Corp., New York, NY (US)

( * ) Notice: Subject to any disclaimer, the term of this patent is extended or adjusted under 35 U.S.C. 154(b) by 0 days.

(21) Appl. No.: 09/482,056

(22) Filed: Jan. 13, 2000

(51) Int. Cl.[7] .......................... H04M 3/42; H04M 7/00; H04M 11/04
(52) U.S. Cl. .................. 379/207.02; 379/37; 379/45; 379/201.02; 379/201.12; 379/220.01; 379/221.08
(58) Field of Search ........................ 379/37, 38, 39, 379/40, 41, 42, 43, 44, 45, 201.01, 201.02, 201.05, 201.12, 207.02, 207.13, 219, 220.01, 221.08, 221.09, 221.1

(56) References Cited

U.S. PATENT DOCUMENTS

| 4,277,649 A | * | 7/1981 | Sheinbein | 379/211.02 |
|---|---|---|---|---|
| 5,012,511 A | | 4/1991 | Hanle et al. | 379/201.05 |
| 5,455,853 A | | 10/1995 | Cebulka et al. | 379/201.03 |
| 5,467,388 A | | 11/1995 | Redd, Jr. et al. | 379/210.02 |
| 5,708,702 A | | 1/1998 | De Paul et al. | 379/221.1 |
| 5,754,634 A | | 5/1998 | Kay et al. | 379/112.01 |
| 5,864,612 A | | 1/1999 | Strauss et al. | 379/142.03 |
| 5,883,946 A | | 3/1999 | Beck et al. | 379/201.12 |
| 5,920,618 A | * | 7/1999 | Fleischer et al. | 379/221.09 |
| 6,160,877 A | * | 12/2000 | Tatchell et al. | 379/197 |
| 6,229,887 B1 | * | 5/2001 | Albers et al. | 379/219 |
| 6,330,324 B1 | * | 12/2001 | Sabinson et al. | 379/221.08 |

* cited by examiner

Primary Examiner—Harry S. Hong

(57) ABSTRACT

An advanced intelligent network (AIN) stores, at time of service provisioning, call processing records (CPRs) associated with select special needs services. The CPR initiates alternative processing or suppresses processing of a CPR associated with a called party to provide special services. For example, public safety and emergency readiness and response organizations are identified at time of initial service provisioning with an appropriate passive user service CPR stored in a service control point thereby invoking special call processing requirements when calling another subscriber. Thus, subscriber AIN services which might block or reroute a call placed by an emergency organization would be suppressed by operation of the CPR associated with the calling telephone line. Other special need calls might also be accommodated. For example, hearing-impaired services may be provided by a called subscriber subject to identification of a calling party requiring such services by a passive user service CPR associated with the calling party.

26 Claims, 3 Drawing Sheets

SPECIAL NEED PROCESSING OF SERVICES PROVIDED BY AN ADVANCED INTELLIGENT NETWORK

BACKGROUND OF THE INVENTION

1. Field of the Invention

The present invention relates generally to telecommunications systems and more particularly to a method and system for providing alternative routing consistent with a calling party profile when subject to enhanced services provided to a called party.

2. Description of the Related Technology

Integration of computer based service logic into centralized platforms within the public switched telephone network (PSTN) has resulted in the deployment of many new service features. The enhanced telephone network is often referred to as an Advanced Intelligent Network (AIN). In an AIN type system, local and/or toll offices of the public telephone network detect one of a number of call processing events identified as AIN "triggers" and the response, retrieve, routing instructions form a centralized database. For ordinary telephone service calls, there would be no event to trigger AIN processing, and the local and toll office switches would function normally and process such calls without referring to the central database for instructions. However, an office which detects a trigger will suspend call processing, compile a call data message and forward that message via a common channel interoffice signaling (CCIS) link to a service control point (SCP), such as the Telecordia ISCP®, which includes a multi-services application platform database.

The ISCP is essentially a central control for the network. If needed, the ISCP can instruct the central office to obtain and forward additional information. Once sufficient information about the call has reached the ISCP, the ISCP accesses its stored data tables in its database to translate the received message data into a call control message and returns the call control message to the office of the network via a CCIS link. The network offices then use the call control message to complete the particular call.

Thus, the typical AIN architecture allows the switched transport (e.g., voice) network to interact with database systems and other so-called intelligent peripherals for obtaining information, data and support operations. This occurs when the switching network is triggered to access the database or peripheral by some condition that arises when a telephone call is being processed. An AIN trigger will typically arise in an AIN-equipped switch, and that will cause the switch to refer to a database for information or service to support processing of the call.

The widespread adoption of such systems for routing and servicing telephone calls has provided the opportunity to create and provision enhanced services throughout the public switched telephone network. These services include alternative routing and call blocking services that redirect calls to other locations, provide call screening and messaging services, and other processing.

For example, the commonly-assigned patent of Redd, Jr. et al., U.S. Pat. No. 5,467,388, entitled "Method and Apparatus for Selectively Blocking Incoming Calls," issued Nov. 14, 1995, the disclosure of which is incorporated herein in its entirety by reference, discloses a selective call blocking service and a method of supplying a list of numbers and authorization tiers to be stored in an ISCP database for a selective call blocking system. Specifically, the ISCP responds to a transaction capabilities applications protocol (TCAP) query message, generated at a central office switch in response to a subscriber call, by providing call processing data to the central office switch in order to establish an interface session with the subscriber. The interface session may be established, for example, by terminating the subscriber call to an intelligent peripheral (IP) that accepts DTMF inputs. During the interface session, the subscriber inputs the telephone numbers and authorization tiers using the DTMF keypad. After the interface session, the data input by the subscriber identifying telephone numbers authorized to bypass the subscriber's call blocking service is loaded into the ISCP database.

Another example of an AIN enabled service include remote access to call forwarding (Ultraforward). Using this service, callers may call in to remotely activate and/or change their call forwarding number. Thus, as with Selective Call Blocking, a call placed to a particular telephone number may not be completed, if at all, to the telephone number dialed.

Rerouting or inhibiting completion of telephone calls under the control of the subscriber being called is not normally a problem. However, there are situations when it is necessary to complete a call to a particular telephone line in spite of such services. For example, public safety and emergency readiness and response organizations may need to call particular locations within a defined geographic area to warn of an emergency or announce an evacuation. Public safety answering points (PSAPs) handling incoming 911 emergency calls may sometimes need to call back to someone after a call to the PSAP has been disconnected, either intentionally or otherwise. Because of these safety concerns, police and public safety organizations may require the capability to rapidly and simply bypass such call blocking and rerouting services.

To address this problem, Redd, Jr. et al., '388 provides that emergency numbers be provided to access the subscriber's station by use of a Caller IDTM or automatic number information (ANI) system, by a PIN, or by a combination of both. The telephone service provider must provide a database containing the caller numbers of all Police, Fire, and medical emergency officials. When a call is made from one of these numbers, the system recognizes the call as being from one of the numbers on the emergency database list and allows direct access to the call to the subscriber's telephone. A specialized central database of such numbers must be maintained and updated when emergency caller numbers are changed or added to (e.g., new fire station or the like).

One difficulty with the use of a PIN is that the entire call deferral process may be easily defeated if the special access code is compromised. For example, if a special access code is provided to emergency personnel (Police, Fire Department, Hospital, or the like), it is foreseeable that the access code may eventually be disclosed to unauthorized users. Another difficulty is that the call is not automatically completed, but requires entry of the access code, taking additional time and being prone to entry error. Systems requiring multiple access codes are less likely to be compromised, but are even more cumbersome and therefore less likely to be acceptable for dealing with emergency situations.

A difficulty with a list based bypass system is establishing and maintaining the database of emergency agency telephone numbers. This is because of several factors. For example, emergency facilities, such as PSAPs, have a large number of telephone lines and/or trunks terminating at their facilities. The line and telephone numbers associated with these facilities may not be readily ascertainable or known by the facility personnel. Even if such information is made available, the telephone numbers are subject to change as facilities and equipment change, due to system expansion, and when an emergency center relocates. Further, the administration of such information raises difficulties with the telephone service provider that must confirm the authority of agencies submitting lists of emergency telephone numbers prior to programming the telephone switching equipment to recognize the special privileges to be provided. Still another problem involves the maintenance of a specialized, dedicated database of privileged telephone numbers within the telephone system.

SUMMARY OF THE INVENTION

Accordingly, a need exists for emergency operation centers to have the capability to automatically bypass and/or disable call interception and rerouting services operating on a called telephone line.

A further need exists for a system for and method of identifying, verifying, and maintaining appropriate records and updating records of telephone lines of emergency operations centers having call intercept and rerouting bypass privileges and capabilities.

The present invention overcomes the disadvantages of the prior art and provides an integrated system for providing special services to designated subscribers. According to one aspect of the invention, special users are identified during and as part of a service order processing and provisioning, with appropriate passive user call processing records (CPRs) created and stored in a network services control point (SCP). The passive user CPRs are used to augment, alter or inhibit the operation of a service initiated or controlled by the CPR of a called party.

According to one feature of the invention, the telephone lines associated with an emergency services facility are identified at the time an order is placed for provisioning of network facilities. Services triggered by a termination attempt trigger at the terminating switch are inhibited if found to conflict with priority call completion services of the emergency services facility. Thus, call blocking and forwarding services implemented by an advanced intelligent network (AIN) are automatically inhibited in response to an appropriate passive user CPR identified in connection with the calling party. Typically, the emergency services facilities include PSAPs, police and fire departments, etc.

According to another feature of the invention, information about a calling party is obtained during or subsequent to service order processing and stored as a CPR in an SCP database. When a called party subscribes to an inbound service in which such calling party information can be used to process and/or route the incoming call, the CPR of the calling party is retrieved and the call routed in accordance with the CPRs of both parties. For example, a customer service facility may subscribe to a call distribution service for routing calls to alternative call centers. A calling subscriber who has requested to be designated as hearing impaired, could then be rerouted to an appropriate TTY facility. Alternatively, a non-English language speaking caller might be rerouted to an appropriate foreign language service representative.

More specifically, according to one aspect of the invention, an intelligent switching network for providing subscriber specific telephone services includes a telecommunications network having at least one signal switching office and a signaling system, the one signal switching office configured to route calls and detect a call from a calling subscriber number to a called subscriber number on a call-by-call basis. A service controller is interfaced to the signal switching office via the signaling system. The controller includes a database of subscriber service information records corresponding to each of the calling and called subscriber numbers. The services controller is configured to execute network service logic programs for processing communications in the telecommunications network (e.g., routing, billing, collecting data, etc.) with at least one of the network service logic programs responsive to a query from the signal switching office for routing a call from the calling subscriber number to the called subscriber number based on the subscriber information corresponding to both the calling and called subscriber numbers.

According to a feature of the invention, the service controller selectively redirects non-priority calls according to a CPR of the called party and forces emergency calls through to the called party in response to a CPR of the calling party. This is accomplished by selectively (i) causing a routing of the call from the calling subscriber number to an alternative telephone number in response to the service information record of the called party and (ii) suppressing the rerouting of the call from the calling subscriber number to the alternative telephone number in response to the subscriber service information record of the calling party so as to cause the call from the calling subscriber number to be routed to the telephone line associated with the called subscriber number.

According to another feature of the invention, each of the subscriber service information records includes information for one of (i) alternative processing of incoming calls (e.g., routing, billing, data collection, etc.) and (ii) alternative processing of outgoing calls performed in response to the alternative routing information of another of the subscriber service information records. This other subscriber service information record corresponds to the record of the called subscriber.

According to another feature of the invention, an output of the service logic program inhibits call rerouting in response to a special service indicator of the subscriber information corresponding to the calling subscriber number.

According to another feature of the invention, a service order processor is configured to accept subscriber service order information and, in response, provide portions of the subscriber service order information to a plurality of subsystems including the service controller. The service order processor also provides information to a maintenance subsystem for the activation of subscriber telephone services and provides corresponding special service feature information to the service controller. The special service feature information includes information to invoke processing to either (i) selectively inhibit a call completion to the called subscriber number or (ii) selectively bypass an inhibiting of call completion to the called subscriber number in response to special service feature information of the calling subscriber number.

According to a further feature of the invention, the service controller (i) is responsive to the service information record of the called party to initiate a routing of the call from the calling subscriber to one of a predetermined plurality of telephone numbers, and (ii) is responsive to the service information record of the calling party to select the one telephone number from amongst the plurality of telephone numbers.

According to a still further feature of the invention, the signal switching office includes a trigger detection point including a plurality of subscribed triggers corresponding to each of the called subscriber numbers.

According to another aspect of the invention, an intelligent telephone network includes a first plurality of telephone lines and a first service switching point servicing the telephone lines. Similarly, a second plurality of telephone lines are serviced a second service switching point which includes a trigger detection point having a plurality of subscribed triggers corresponding to the second plurality of telephone lines. Communications and signaling networks connect the first and second service switching points with a service control point connected to the signaling network and having a database of call processing records corresponding to the first and second plurality of telephone lines. The service control point also includes service logic responsive to the trigger detection point for accessing (i) a calling of the call processing records corresponding to a call originating one of the first plurality of telephone lines and (ii) a terminating one of the call processing records corresponding to a called one of the second plurality of telephone lines. In response to both the calling and terminating call processing records, call processing (e.g., routing, billing, data collection, etc.) information is provided by the service control point to the second service switching point.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
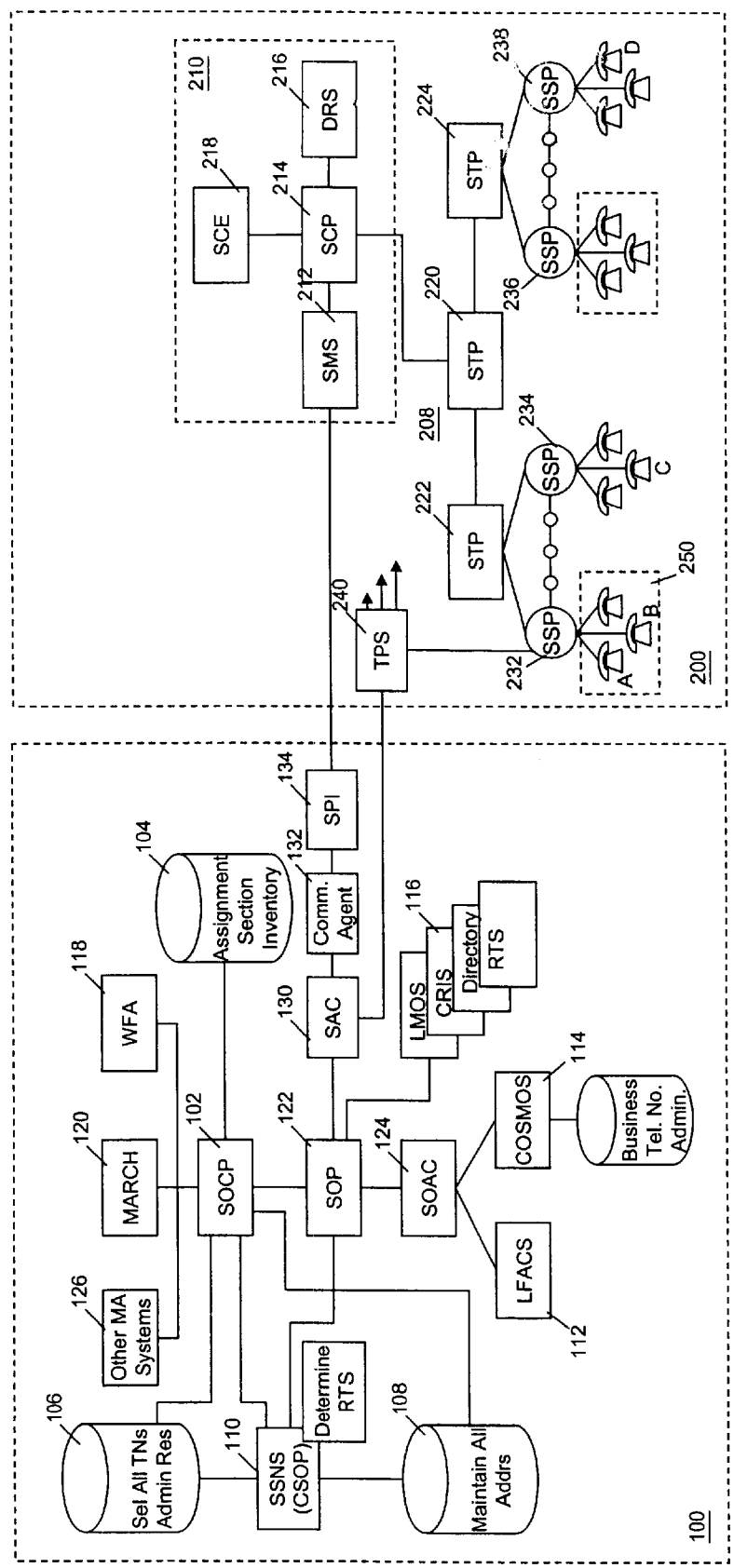
FIG. 1 is a block diagram of the present invention including a service activation subsystem and an advanced intelligent network (AIN).

FIG. 1 depicts the invention including a service activation system 100 and an AIN portion 200. The service activation system 100 includes a service order coordination processor (SOCP) 102 have storages 104, 106 and 108. The SOCP is connected to the sales service negotiation system (SSNS) and common service order processor (CSOP) 110. The SSNS comprises a graphical user interface system that presents information to service representatives from a variety of systems and platforms in a window format to assist negotiation of services and inquiries. The CSOP translates service requests from SSNS into service order format.

The SOCP maintains an inventory of data which includes address information, network facility data and telephone number data. Addresses are associated with specific network facility data that will serve the customer address. Customers are associated with the address being served by the network. Included in the customer information is the telephone number of the customer and the type of service which is provided. Customer data also includes information concerning the current and previous customers, service, and status of each.

In general the SOCP builds, maintains, and deletes information about and based on the customer facility address. This information is provided as required for the service negotiation process and is used in the processing of service activation requests. The customer information associated with the customer facility address supports access to customer data which includes existing and former customer names, class of service, telephone number, status of the line, and disconnect reason. This information also includes special needs services. In the case of emergency services agencies, such as a PSAP, police or fire facilities, the special needs services includes an override capability to inhibit call blocking, rerouting and similar services that would prevent an authorized agency from completing a call to a dialed telephone line. Special needs services may also be directed to other subscriber characteristics and requirements that may be accommodated by special services provided by a called party. For example, designation of a particular subscriber telephone line as belonging to a hearing impaired customer may be used to automatically implement a TTY service offered by the called party. Similarly, service bureaus may offer foreign language services appropriate to a caller as designated by the special need information associated with the calling party telephone line.

The SOCP validates address information provided by the customer requesting service at the time of service negotiation for a service request and provides all customer facility information associated with the address to the service negotiator. Validation may include confirmation of a customer's authority to obtain a particular privileged service, such as call blocking and rerouting override capabilities.

The SOCP facility information includes specific facility information. This facility information includes outside and central office facility data normally listed on the service order, such as: outside facility data-cable and pair for F1, F2, FN; terminal addresses for distribution and feeder, status; and central office facility data; F1 cable and pair location; office equipment (OE) and location and status.

The SOCP provides capability to search by facility data and provide facility information and status and maintains a real-time view of the network facilities inventoried in LFACS 112 and COSMOS 114. SOCP also performs updates to the facility data resulting in activity from the facility inventory systems including LFACS 112 and COSMOS 114. These updates may result from network rearrangements in the form of engineering work orders, maintenance changes, database reconciliations and other service order activity. The telephone number database is built from COSMOS, LFACS, and customer records information system (CRIS), a billing system for exchange services.

SOCP 102 provides an interface to implement interaction between facilities and the service request. Thus, SOCP determines if the service request requires dispatch for customer premises work and, if so, creates data packets containing service request information which are sent to WFA/DO 118.

SOCP 102 also determines if an activation message is required for the service request and the memory administration systems involved. SOCP then creates and distributes activation messages to the various memory administration systems. SOCP also interfaces with MARCH 120 to send activation messages and receive acknowledgment of work completed or error in processing.

SOCP 102 receives requests from other systems both in real time and batch modes. These systems include sales service negotiation system (SSNS), service order processor (SOP), exchange access mechanized input (EAMI) for processing primary interexchange carrier (PIC) orders, and automatic suspension termination referral (ASTR) for processing suspension, denial, restoral and disconnect orders.

SOCP 102 has the functionality to alter and manage distributions depending on the type of service request. Thus, SOCP 102 transmits data to SOP 122, WFA/DO 118, MARCH 120, and the other memory administration systems as required. SOCP 102 receives facility status requests from inventory systems and transmits the facility status back to the requesting system.

As seen in FIG. 1, SOCP 102 is also linked to other elements of the system including MARCH 120, WFA 118, SOP 122, SOAC 124, LFACS 112, COSMOS 114, and other memory administration systems 126. A link to a third net and its connected elements is provided at 128. SOP 122 is linked to SOAC 124 for handling those requests which are not SOCP eligible.

SOP 122 includes an interface to the AIN for providing information to configure the network to provide services for subscribers. This information includes termination attempt triggers (TATs) to be supported by an SSP serving a subscriber and associated call processing records (CPRs) for subscribers. The CPRs include references to the logic necessary to implement conventional AIN services, such as selective call blocking, and in support of passive user services, such as call break-through capabilities required by emergency services agencies and special needs designators for the hearing impaired, non-English speaking subscribers, etc.

SOP 122 provides service order information to a service activation controller (SAC) 130. SAC 130 processes the order and sends a provisioning message to an intermediate network including communications agent 132 and service provider interface (SPI) 134, which, together with service management system 212 and SCE 218, generates or updates CPRs based on the provisioning information in the provisioning message. A detailed description of CPR generation is discussed in U.S. Pat. No. 5,848,141, which is herein incorporated by reference in its entirety.

The created service orders are activated by sending the CPRs to service control point (SCP) 214 of ISCP 210. SCP 214 communicates with the common channel signaling (CCS) network 208 which contains signal transfer points (STPs) 220–224. The CCS network 208 uses the STPs 220–224 to provide packet switching functions for transporting data. Service switching points (SSP) 232–238 receive input from a caller and respond to triggers identified in the trigger provisioning functions.

When SAC 130 receives a message from the intermediate network indicating that a CPR was activated, SAC 130 informs a trigger provisioning system (TPS) 240 to provision triggers to alert the appropriate ones of SSPs 232–238 of the existence of a CPR associated with a customer site.

SSPs 232, 234, 236 and 238 are appropriately equipped programmable switches present in the telephone network, which recognize AIN type calls, launch queries to the ISCP 210 and receive commands and data from the ISCP to further process AIN calls.

SSPs can be programmed to recognize a number of different triggers as an indication that a call is an AIN call. Call blocking and rerouting services typically use a terminating attempt trigger (TAT) active at the terminating switch 238 of the call. SSP 238 then triggers AIN-type servicing based on the TAT.

SSPs 232–238 typically consist of a programmable digital switch with CCIS communications capabilities. One example of such a switch is a 5ESS type switch manufactured by Lucent; but other vendors, such as Northern Telecom and Siemens, manufacture comparable digital switches which could serve as the SSPs.

SSPs 232 and 234 connect to a first local area STP 222, and SSPs 236 and 238 connect to a second local area STP 224. The connections from SSPs to STPs are for signaling purposes. Each local area STP can connect to a large number of the SSPs. Although not shown in FIG. 1, the central offices or SSPs may be interconnected to each other by trunk circuits for carrying telephone services.

Local area STPs 222 and 224, and any number of other such local area STPs between STPs 222 and 224 may communicate with a state or regional STP 220. State or regional STP 220 in turn provides communications with ISCP 210. The STP hierarchy can be expanded or contracted to as many levels as needed to serve any size area and to service any number of stations and central office switches. Links between COs and local area STPs are dedicated CCIS links, typically SS#7 type interoffice data communication channels. Local area STPs are in turn connected to each other and to regional STP 220 via a packet switched network. Regional STP 220 also communicates with ISCP 210 via a packet switched network.

The messages transmitted between SSPs 232–238 and ISCP 210 are all formatted in accord with the transaction capabilities applications protocol (TCAP). The TCAP protocol provides standardized formats for various query and response messages. Each query and response includes data fields for a variety of different pieces of information relating to the current call. An initial TCAP query from the SSP may include, among other data, a "service key" which comprises the calling party's address and digits representing the called party (i.e., subscriber's) address. The TCAP specifies a number of additional message formats, for example a format for a subsequent query from the SSP, and formats for "INVOKE" responses for instructing the SSP to play an announcement or to play an announcement and collect digits.

As shown in FIG. 1, ISCP 210 may comprise an integrated system. Among other system components, ISCP 210 includes service management system (SMS) 212, data and reporting system (DRS) 216 and the actual database or service control point (SCP) 214. ISCP 210 also typically includes a terminal subsystem referred to as a service provisioning and creation environment or SPACE 218 for programming the database in SCP 214 for the services subscribed to by each customer.

Each central office switching system normally responds to a service request on a local communication line connected thereto to selectively connect the requesting line to another selected local communication line. The connection can be made locally through only the connected central office switching system. For example, for a call from station A to station B, SSP 232 provides the call connection without any connection to another central office. When the called line connects to a distant station, for example when station A calls station D, the connection is made through the connected central office switching system SSP 232 and at least one other central office switching system SSP 238 through the telephone trunks interconnecting the two COs.

When a caller at station A attempts to call a subscriber at station D when selective call blocking has been enabled, the call is routed in the usual fashion from caller A, through SSP 232 and interconnecting trunk lines to SSP 238. SSP 238, through its internal translation tables, recognizes that the subscriber's number being called has been activated with the selective call block feature, suspends the incoming call from caller A, generates a TAT, and requires a TCAP query message to be sent to ISCP 210 prior to further call processing. Interchange of messages between SSP 232 and ISCP 210 determines the functions (e.g., announcement, acceptance of PIN information, call placement) that the switch will perform.

The TCAP message includes identification of both the calling and called telephone numbers. While conventional AIN services rely only upon the triggers and CPR associated with either the calling or called party, but not both, special needs processing uses the calling party's CPR to modify or bypass services invoked by the called party's CPR. Thus, SCP 214 accesses the CPR associated with telephone line D and determines that call block processing is to be initiated subject to special needs indicated by the calling party's CPR. In the present call block example, prior to or as part of the processing of the call block CPR associated with called subscriber D, SCP 214 searches for and retrieves any special needs CPR associated with caller A. If caller A is associated with an emergency services facility 250 such as a PSAP, then the appropriate special needs CPR will be available to cause SCP 214 to inhibit call blocking processing such that ISCP 210 instructs SSP 238 to connect caller A to subscriber D.

If no special needs CPR associated with caller D inhibits call blocking, then ISCP 210 may instruct SSP 238 to play a prerecorded announcement which may be stored at SSP 238, and receive a string of digits input from caller A in DTMF format. The recording may be a standard recording provided by SSP 238 which may announce.

"The number you have reached is unavailable to take your call. Please enter your PIN after the tone, or stay on the line to leave a message."

SSP 238 may then receive a string of DTMF digits comprising the caller's entered PIN or note the absence of digits. These DTMF digits (or absence thereof) may then be transmitted to ISCP 210. ISCP 210 compares the received PIN to those numbers stored in the subscriber's authorized tier levels stored in database 214. If the PIN entered by the caller matches an authorized PIN stored in database 214, ISCP 210 instructs SSP 238 to connect the call. If the PIN entered by the caller does not match an authorized PIN, or, if no PIN is entered, ISCP 210 instructs SSP 238 to connect caller A to a voice message system (if available) or disconnect the call.

In a similar manner, ISCP 210 may instruct SSP 238 to connect caller A after comparing the caller's number from the TCAP message to a list of subscriber-designated authorized numbers in database 214. If the caller's number matches an authorized number in database 214, ISCP 210 may instruct SSP 238 to connect caller A to subscriber D.

Figure 2:
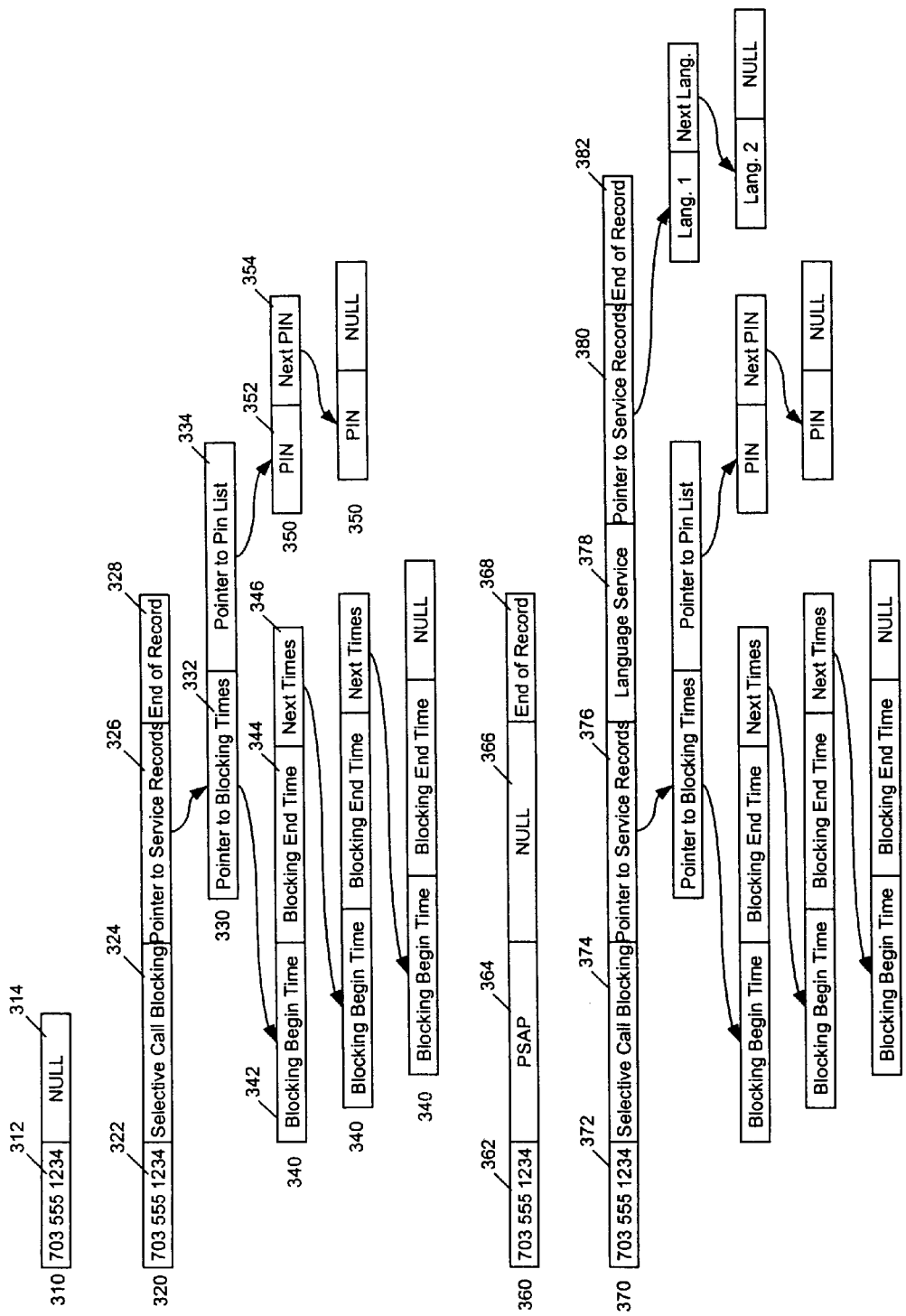
FIG. 2 is a diagram of call processing record formats according to the invention.

FIG. 2 shows the format of call processing records accommodating both active subscriber and passive user type CPRs. In the degenerate case of CPR 310, a subscriber associated with a telephone number stored in a field 312 includes a null pointer 314 indicating that no services are associated with the subscriber.

Data associated with a time-of-day call blocking service is shown in record 320. A user designated by telephone line number field 322 subscribes to the AIN service indicated in identifier field 324, in this case selective call blocking. Field 326, associated with AIN service identifier field 324, includes a pointer to data required by the CPR for providing the indicated service. In this case, an initial record 330 associated with the AIN service identified by field 324 includes further pointers to records 340 containing service activation times and records 350 having lists of PINs of callers authorized to have their calls completed to the subscriber.

Record 360 is associated with a passive user service, in this case a PSAP having authority to bypass call blocking and rerouting services. In this example, the bypass function CPR is identified by field 364 with no further data required resulting in field 366 being a null or ignored. As will be seen in connection with the next example, field 366 may, alternatively, point to data required to support a passive user service CPR identified by field 364.

Record 370 is associated with a subscriber identified by field 372 having both an active AIN service identified by field 374 and a passive user AIN service identified by field 378. Thus, in the example of 370, calls placed to the subscriber are subject to a selective call blocking service identified in field 374 with associated call blocking times and caller PINS identified with reference to data pointer field 376.

Special services are indicated by data field 378 identifying a passive user service, in this case a CPR associated with a foreign language requirement. Data for the CPR is identified by pointer field 380 which, for example, includes identification of foreign languages spoken by the subscriber. The passive user's CPR is used in combination with the CPR of a called party to provide special handling applicable to the calling party identified by field 372. For example, if subscriber 372 initiates a call to another subscriber having an active AIN service which can accommodate special requirements of calling parties, such as TTY capabilities for hearing impaired or, in the present example, special language requirements, this calling party information (i.e., passive user service CPR) is retrieved and used in combination with the primary active CPR.

Figure 3:
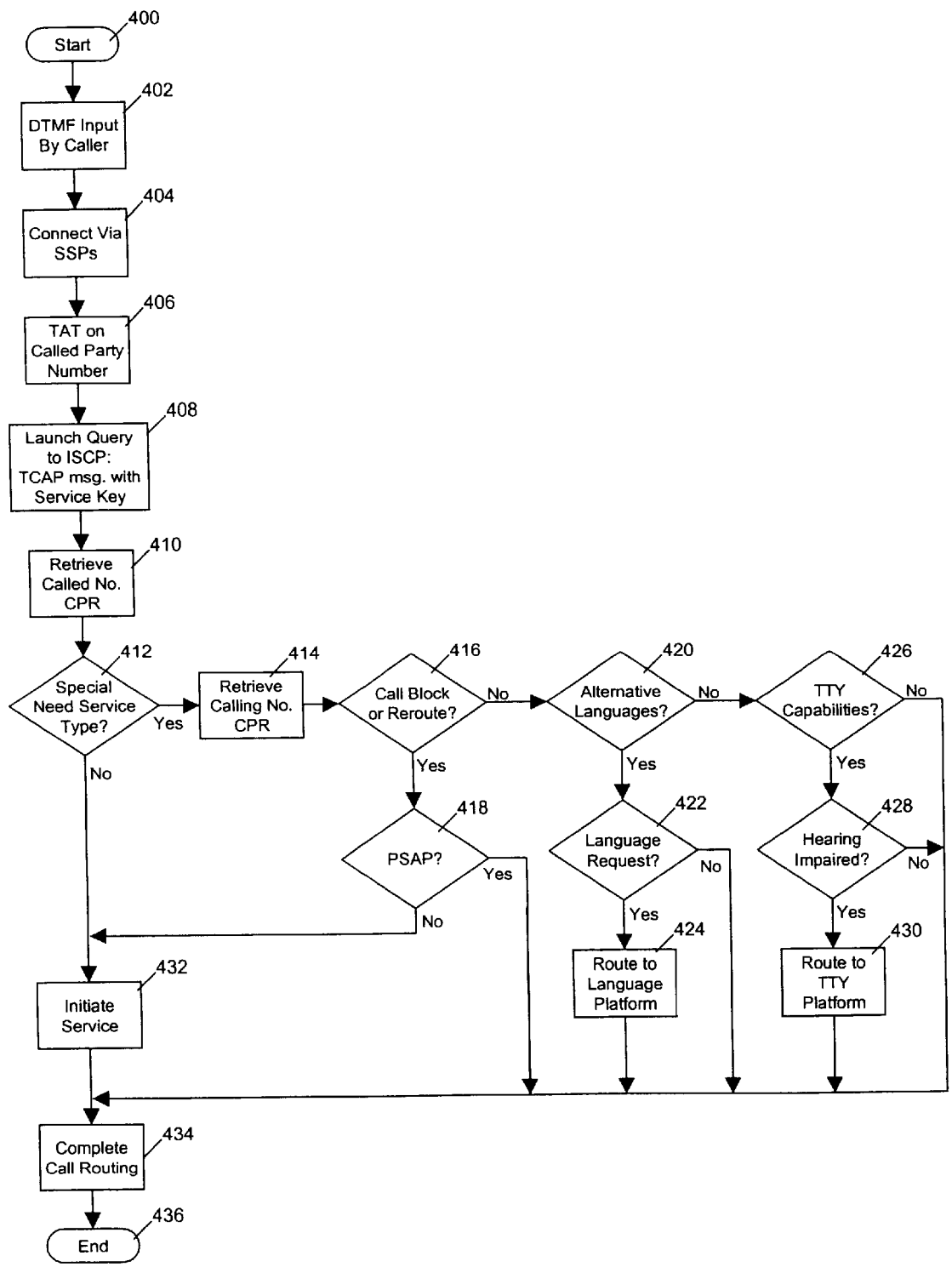
FIG. 3 is a flow chart that illustrates call processing in accordance with an embodiment of the invention.

A flow chart illustrating call processing is shown in FIG. 3. The process is entered at 400 whereupon a calling party dials a telephone number of a subscriber (i.e., called party) at 402, that information being forwarded via the signaling system to the SSP serving the called subscriber at step 404. At step 406 a terminating attempt trigger (TAT) associated with the called subscriber is identified by the SSP associated with the called subscriber and a TCAP message including service key is launched to the ISCP at step 408. This TCAP message includes various information including the telephone numbers of the calling party and of the called subscriber. In response to the TCAP message, the ISCP retrieves the CPR associated with the subscriber at step 410. At decision point 412, the ISCP makes a determination if the retrieved CPR is subject to special processing which may be invoked by a passive user service CPR. If the called subscriber CPR is not subject to any special processing based on the identity or other information about the calling party, then processing continues at step 432 to initiate the service associated with the retrieved CPR.

If the retrieved CPR is subject to special processing, then the CPR associated with the calling party is retrieved at step 414. If the special processing invoked by the called subscriber's CPR includes call blocking or call rerouting, then a decision is made at block 416 to continue processing at 418 to determine if the calling party's CPR would inhibit or bypass the service. For example, if the calling party's CPR indicates that it is a PSAP, then the call blocking or rerouting service processing of block 432 is bypassed and routing to the dialed telephone line is completed at block 434. Otherwise, if the calling party's CPR is either not found or, if found, does not indicate that call blocking or rerouting should be bypassed, then processing continues at step 432 where the service processing is performed (i.e., the call is blocked unless an authorized PIN is entered).

If the AIN service is not a call block or reroute function, then processing continues at decision block 420 to determine if another AIN service subject to special requirements of a calling party has been triggered, in this case an alternative languages service. Thus, if the AIN service associated with the subscriber provides for non-English speaking callers, then processing continues at step 422 to identify any special language requests indicated by the calling party's CPR. Any such special handling is accomplished at step 424. Likewise, special handling of hearing impaired is provided by steps 426–430. Although the default case once special needs servicing is identified at step 412 would avoid normal service processing at 432, an alternative configuration would default to performance of the indicated service or portions thereof executable without reference to a calling party's CPR.

Thus, as detailed herein, the invention combines CPRs and related data of both a called subscriber and associated with a calling party to provide AIN services. In the case of public safety and emergency readiness and response organizations, alternative processing may involve inhibiting services that would block or reroute a call. In the case of other special needs, the called subscriber's AIN service may accommodate and/or incorporate the CPR of a calling party or, alternatively, the CPR of the calling party may be substituted for or bypass the called subscriber's CPR. Calling party CPR information is included at the time of service provisioning of the calling party so as to ensure that the AIN system recognizes any special requirements or needs and that any such special privileges associated with such requirements are properly authorized and associated only with appropriate organizations and/or subscribers.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. For example, the invention further contemplates the initiation and/or performance of processing other than routing. That is, the invention encompasses other forms of processing based on the combination of calling and called party subscriber records, including invoking or implementing billing and data collection processing in response to and dependent on data stored in both records. Further, although an embodiment of the invention has been described in terms of routing to and completing a call to a telephone line, processing may include routing to or the provision of other resources including recorded messages, intelligent peripherals and processors, etc.

What is claimed is:

1. An intelligent switching network for providing subscriber specific telephone services comprising:
   a telecommunications network having at least one signal switching office and a signaling system, said one signal switching office for routing calls and detecting a call from a calling subscriber number to a called subscriber number on a call-by-call basis;
   a service controller interfaced to said signal switching office via said signaling system and including a database of subscriber service information records corresponding to each said calling and called subscriber numbers, said services controller operative to execute network service logic programs for routing communications in said telecommunications network, at least one of said network service logic programs being responsive to a query from said at least one signal switching office for controlling a routing of a call from said calling subscriber number to said called subscriber number based on said subscriber information corresponding to both said calling and called subscriber numbers.

2. The intelligent switching network according to claim 1 wherein said service controller is operative to selectively (i) cause a rerouting of said call from said calling subscriber number to an alternative telephone number in response to said service information record of said called party and (ii) suppress said rerouting of said call from said calling subscriber number to said alternative telephone number in response to said subscriber service information record of said calling party so as to cause said call from said calling subscriber number to be routed to said called subscriber number.

3. The intelligent switching network according to claim 1 wherein each of said subscriber service information records includes information for one of (i) alternative processing of incoming calls and (ii) alternative processing of outgoing calls performed in response to said alternative processing information of another of said subscriber service information records.

4. The intelligent switching network according to claim 3 wherein said another of said subscriber service information records corresponds to a called subscriber.

5. The intelligent switching network according to claim 1 wherein an output of said service logic program causing said call to be routed other than to said called subscriber number is inhibited in response to a special service indicator of said subscriber information corresponding to said calling subscriber number.

6. The intelligent switching network according to claim 1 further comprising a service order processor operative to accept subscriber service order information and, in response, provide portions of said subscriber service order information to a plurality of subsystems including said service controller.

7. The intelligent switching network according to claim 6 wherein said service order processor provides information to a maintenance subsystem for the activation of subscriber telephone services and provides corresponding special service feature information to said service controller.

8. The intelligent switching network according to claim 7 wherein said special service feature information includes information to one of (i) selectively inhibit a call completion to said called subscriber number and (ii) selectively bypass an inhibiting of call completion to said called subscriber number in response to special service feature information of said calling subscriber number.

9. The intelligent switching network according to claim 1 wherein said service controller (i) is responsive to said service information record of said called party to initiate a routing of said call from said calling subscriber to one of a predetermined plurality of telephone numbers, and (ii) is responsive to said service information record of said calling party to select said one telephone number from amongst said plurality of telephone numbers.

10. The intelligent switching network according to claim 1 wherein said service controller (i) is responsive to said service information record of said called party to initiate a rerouting of said call from said calling subscriber to one of a plurality of telephone numbers and resources and (ii) is responsive to said service information record of said calling party to select one of said plurality of telephone numbers and resources.

11. The intelligent switching network according to claim 1 wherein said signal switching office includes a trigger detection point including a plurality of subscribed triggers corresponding to each of said called subscriber numbers.

12. An intelligent telephone network comprising:
   a first plurality of telephone lines;
   a first service switching point servicing said first plurality of telephone lines;
   a second plurality of telephone lines;
   a second service switching point servicing said second plurality of telephone lines and including a trigger detection point having a plurality of subscribed triggers corresponding to said second plurality of telephone lines;
   communications and signaling networks connecting said first and second service switching points; and
   a service control point connected to said signaling network and having a database of call processing records corresponding to said first and second plurality of telephone lines and service logic responsive to said trigger detection point for accessing (i) a calling one of said call processing records corresponding to a call originating one of said first plurality of telephone lines and (ii) a terminating one of said call processing records corresponding to a called one of said second plurality of telephone lines and, in response to both said calling and terminating call processing records, providing call processing information to said second service switching point.

13. The intelligent telephone network according to claim 12 further comprising a service order processor providing service order information including said call processing records and subscriber information corresponding to respective ones of said processing records.

14. The intelligent telephone network according to claim 12 further comprising a voice platform configured to play an announcement to a calling party in response to said routing information causing a telephone call to be inhibited from completing to said called one of said second plurality of telephone lines.

15. An intelligent switching network comprising:
   a service order system for processing subscriber order requests;
   an intelligent telephone network including a plurality of service switching points (SSP) interconnected by a signal transfer point (STP) for routing calls between said SSPs;
   a plurality of telephone lines having associated therewith respective telephone numbers serviced by said SSPs; and
   a database storing a plurality of subscriber service profiles associated with respective ones of said telephone numbers and including, for each of said telephone numbers, at least one of (i) enhanced services for processing calls to an associated one of said telephone numbers, and (ii) passive user services information for processing of calls made from said associated ones of said telephone numbers to another one of said telephone numbers; wherein
      said service order system includes an interface to said database for storing said subscriber service profiles wherein said intelligent telephone network is responsive to said subscriber service profiles for selectively routing said call to associated ones of said telephone numbers.

16. The intelligent switching network according to claim 15 wherein said intelligent telephone network is operative to selectively route a call from (i) a calling terminal assigned a first one of said telephone numbers and having associated therewith a one of said passive user services information to (ii) a called terminal assigned a second one of said telephone numbers and having associated therewith a one of said enhanced services, said network responsive to both of said one of said passive user services information and said one of said enhanced services for selectively routing said call.

17. The intelligent switching network according to claim 15 wherein said intelligent telephone network is operative to selectively (i) cause a rerouting of said call from said calling subscriber number to an alternative telephone number in response to said service information record of said called party and (ii) suppress said rerouting of said call from said calling subscriber number to said alternative telephone number in response to said subscriber service information record of said calling party so as to cause said call from said calling subscriber number to be routed to said called subscriber number.

18. The intelligent switching network according to claim 15 wherein each of said subscriber service information records includes information for one of (i) alternative processing of incoming calls and (ii) alternative processing of outgoing calls performed in response to said alternative routing information of another of said subscriber service information records.

19. The intelligent switching network according to claim 18 wherein said another of said subscriber service information records corresponds to a called subscriber.

20. The intelligent switching network according to claim 15 wherein an output of said service logic program causing said call to be routed other than to said called subscriber number is inhibited in response to a special service indicator of said subscriber information corresponding to said calling subscriber number.

21. The intelligent switching network according to claim 15 further comprising a service order processor operative to accept subscriber service order information and, in response, provide portions of said subscriber service order information to a plurality of subsystems including said service controller.

22. The intelligent switching network according to claim 21 wherein said service order processor provides information to a maintenance subsystem for the activation of subscriber telephone services and provides corresponding special service feature information to said service controller.

23. The intelligent switching network according to claim 22 wherein said special service feature information includes information to one of (i) selectively inhibit a call completion to said called subscriber number and (ii) selectively bypass an inhibiting of call completion to said called subscriber number in response to special service feature information of said calling subscriber number.

24. A method of providing services in an advanced intelligent network, comprising the steps of:
   triggering exception processing at a communication node associated with a called subscriber;
   retrieving, from a common database, call processing records (CPR) associated with (i) said subscriber and (ii) a calling party; and
   in response to said CPR of said calling party, selectively executing said CPR of said subscriber.

25. The method according to claim 24 further comprising a step of provisioning network service for said calling party so as to provide access to said calling party to said network and including a step of storing in said database said CPR of said calling party.

26. The method according to claim 24 wherein said CPR of said calling party inhibits execution of said CPR of said subscriber.

* * * * *